United States Patent
Patapoutian

(10) Patent No.: US 7,308,057 B1
(45) Date of Patent: Dec. 11, 2007

(54) BASELINE WANDER COMPENSATION FOR PERPENDICULAR RECORDING

(75) Inventor: Ara Patapoutian, Hopkinton, MA (US)

(73) Assignee: Maxtor Corporation, Longmont, CO (US)

( * ) Notice: Subject to any disclaimer, the term of this patent is extended or adjusted under 35 U.S.C. 154(b) by 707 days.

(21) Appl. No.: 10/859,688

(22) Filed: Jun. 3, 2004

Related U.S. Application Data

(60) Provisional application No. 60/476,052, filed on Jun. 5, 2003.

(51) Int. Cl.
*H04B 1/10* (2006.01)
(52) U.S. Cl. .................................................. 375/350
(58) Field of Classification Search ............... 375/317, 375/319, 340, 342, 346, 350; 327/307; 360/39, 360/46
See application file for complete search history.

(56) References Cited

U.S. PATENT DOCUMENTS

| | | | |
|---|---|---|---|
| 5,278,846 A | 1/1994 | Okayama et al. | |
| 5,742,620 A | 4/1998 | Iwamura | |
| 5,757,821 A | 5/1998 | Jamal et al. | |
| 5,875,199 A | 2/1999 | Luthi | |
| 5,968,198 A | 10/1999 | Hassan et al. | |
| 6,211,716 B1 * | 4/2001 | Nguyen et al. | 327/307 |
| 6,381,726 B1 | 4/2002 | Weng | |
| 7,116,504 B1 * | 10/2006 | Oberg | 360/39 |
| 7,167,327 B2 * | 1/2007 | Feyh | 360/46 |

* cited by examiner

*Primary Examiner*—Don N. Vo
(74) *Attorney, Agent, or Firm*—Cesari and McKenna, LLP

(57) ABSTRACT

Baseline wander is compensated for by processing a read channel waveform to produce an estimated data decision signal, updating an estimated baseline wander signal by filtering the estimated data signal to produce an estimate of an associated pulse tail, combining that estimate with a prior estimated baseline wander signal to produce an updated estimated baseline wander signal, and combining the updated estimated baseline wander signal with the incoming signal at a next sample time. The operations continue recursively for next signal samples.

17 Claims, 11 Drawing Sheets

BASELINE WANDER COMPENSATION FOR PERPENDICULAR RECORDING

CROSS REFERENCE TO RELATED APPLICATIONS

This application claims the benefit of U.S. Provisional Patent Application No. 60/476,052, filed Jun. 5, 2003, which is incorporated herein by reference in its entirety for all purposes.

FIELD OF THE INVENTION

The invention relates to perpendicular recording media and, more particularly, to baseline wander compensation.

BACKGROUND

Longitudinal and perpendicular recording media used in disk drives are associated with different signal and noise characteristics at the output of the read-head. For example, in the frequency domain a perpendicular channel has a pulse response with an abrupt amplitude change around the "DC notch." The abrupt amplitude change in the perpendicular channel results in a pulse response with a long tail in the time domain. The pulse response and, in particular, the long tail, occur because of the physical properties of the head and the recording media. The long tailed response is further affected by the high pass filtering of the signal produced by the read head. The superposition of the pulse tails is commonly referred to as "baseline wander." The baseline wander acts as a noise source, and it can become a major source of impairment. Furthermore, the baseline wander is data dependent, and for pathological data it significantly degrades drive performance.

An ideal approach to handling baseline wander is to incorporate the pulse tail into the pulse response that the read channel detector expects at its input, that is, into the "target impulse response," or TIR. The complexity of the detector grows exponentially with pulse length, however, and it becomes impossible to realize such a detector.

To limit baseline wander, modulation codes known as "DC-free codes" can be used to encode the data bits. These codes impose constraints in the data patterns such that the total accumulated data charge and subsequently the baseline wander is close to zero. Unfortunately, the code-rate loss associated with such DC-free codes is significant.

Another approach to limiting baseline wander is to modify the amplitude change at the DC notch from an abrupt change to a gradual one. Since there is no abrupt amplitude change in the frequency domain, the corresponding time domain pulse tail is very short and can be included in the TIR. Although the baseline wander is essentially eliminated by the pulse shaping, the shaping removes a significant portion of the pulse energy at low frequencies, which results in higher error rates.

Still another approach is baseline wander compensation. Additional circuitry is included to estimate and then compensate for the baseline wander. Such circuitry is referred to as a "DC-loop." The DC-loop estimates baseline wander from the associated error signal at the detector, i.e., from the difference between observed and expected samples. Under present loop delays and high-pass cutoff frequency requirements, known baseline wander compensation circuits suffer performance loss, especially with worst case data sequences.

It is also possible to combine multiple approaches. For example, a weak DC-free code, a DC-loop and a TIR with attenuated DC content may all be employed in the same architecture to minimize baseline wander at the detector input. However, known prior systems suffer some or all of the problems discussed above.

While perpendicular recording offers the potential for better error rate performance at the detector output than longitudinal recording due to the additional signal power at low frequencies, such gain remains partly illusive because of the presence of baseline wander. Thus, an effective approach to baseline wander compensation in perpendicular recording systems remains a major signal processing challenge.

SUMMARY

The invention relates to baseline wander compensation techniques, in particular, those which would enable more effective use of low frequency signal components in a perpendicular recording channel, as well as in other types of channels that may experience the effects of baseline wander.

In one aspect, the inventive system includes a filter that filters an estimated data decision signal to produce an estimate of the associated pulse tail and combines the results with a prior estimated baseline wander signal. The system then compensates for baseline wander by combining a next signal sample with the updated estimated baseline wander signal. The system is recursive, and the updated estimated baseline wander signal then becomes the estimated baseline wander signal used to calculate an updated estimated baseline wander signal. The estimated baseline wander signal that is fed back to the filter is scaled by a factor that is based on the time constant of the filter. In further embodiments, the filtering steps includes compensation for associated processing delay by optimizing the filter gain coefficient.

In another embodiment, the system has two inputs, namely the estimated data decision signal as discussed and also an estimated signal, that is an idea waveform. The system then combines the estimated signal with the incoming signal to produce a residual signal, that is, an error signal. The error signal is filtered in accordance with Kalman gain coefficient to produce an updated residual signal. The system then combines the updated residual signal with the estimate of the associated pulse tail before combining the results with the prior estimated baseline wander signal to produce an updated baseline wander signal.

In the version of the system that has two inputs to the filter, the incoming signal is delayed by the amount of time that the system takes to produce the estimated signal, and the delayed signal and the estimated signal are then combined to produce the residual signal. Further, the gain coefficient of the filter may be optimized to compensate for the processing delay, which includes the delay in producing the estimated signal as well as the delay through the filter.

A further embodiment, which also uses both the estimated signal and the data decision signal, combines into the residual feedback terms that are based on scaled and delayed versions of the estimated baseline wander signal and may also include a manipulated data signal that is based on a predetermined number of prior estimated data decision signals, to further compensate for the processing delay.

Other features and advantages of the invention will be apparent from the following detailed description, and from the claims.

BRIEF DESCRIPTION OF THE DRAWINGS

Like reference numerals will be used to represent like elements.

DETAILED DESCRIPTION

Figure 1:
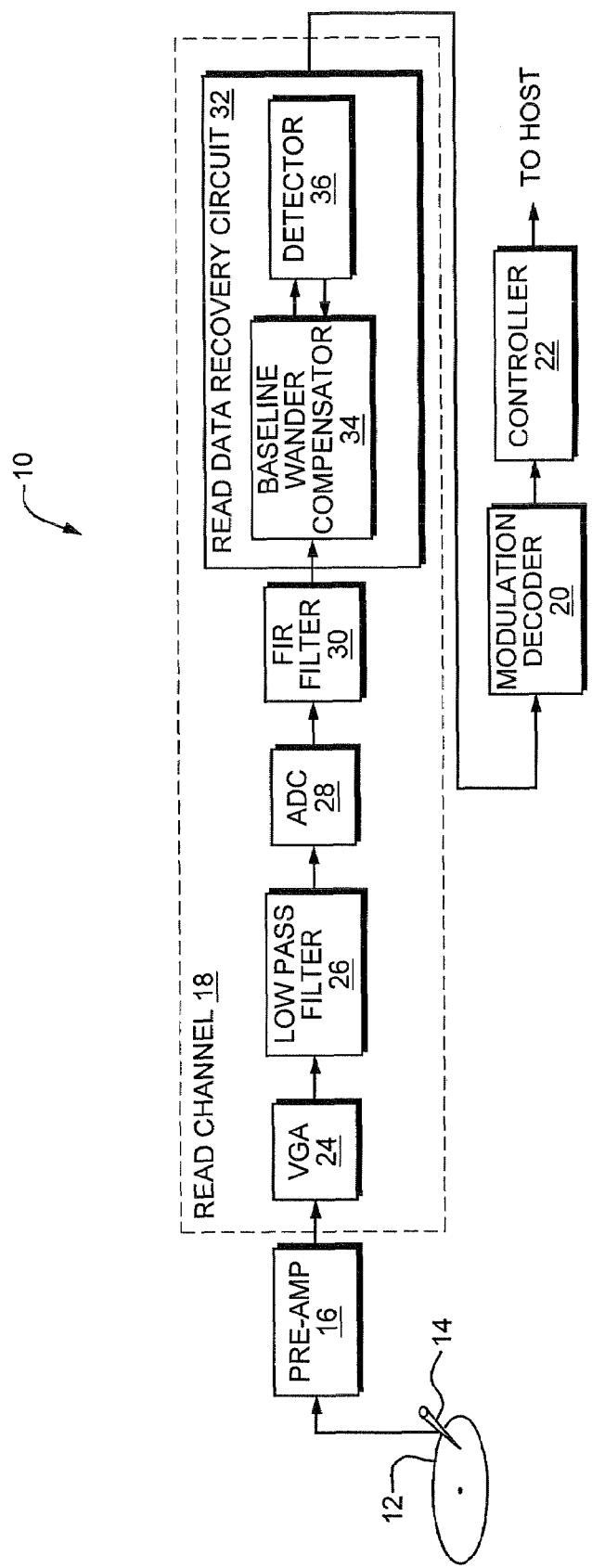
FIG. 1 is a block diagram of a disk drive system having a read channel that includes a read signal data recovery circuit configured to perform baseline wander (BW) compensation.

Referring to FIG. 1, a disk drive system 10 includes a recording medium 12, a read head 14, a read amplifier (or "pre-amplifier") 16, a read channel 18, a decoder 20 and a controller 22. The read channel 18 includes a variable gain amplifier (VGA) 24, a low-pass filter 26, an analog-to-digital converter (ADC) 28, a digital equalizer or finite impulse response (FIR) filter 30 and a read data recovery circuit 32. The read data recovery circuit 32 includes a baseline wander compensator 34 coupled to a detector 36. Details of the system's write elements, servo control and head/disk assembly, as well as read channel timing recovery, are omitted for simplification and clarity. The detector 36 may be implemented as a Viterbi detector, particularly suited for a magnetic disk drive. For other types of disk drives, e.g., optical, a different type of detector could be used, e.g., a threshold detector.

The read head 14 produces signals that correspond to the data recorded on the recording medium 12. The read amplifier 16 amplifies the signals, which pass on to the analog front-end of the read channel 18, that is, the VGA 24 (controlled in an automatic gain control loop, not shown), the low-pass filter 26 and the ADC 28. After processing by the analog front-end read channel electronics, the signals are further processed by the FIR filter 30 and the detector 36, which perform the functions of adaptive equalization and sequence detection, respectively. The decoder 20 receives the detector output and decodes the information to generate read data that corresponds to original user data. Typically, the controller provides the read data to a host system (not shown) for further processing.

In addition to the above-described read-related functions, and in accordance with the present invention, the baseline wander compensator 34 implements a novel baseline wander compensation algorithm, or DC loop, to improve system performance under both random and especially pathological data sequences. The baseline wander compensator 34 may be based on various filtering models, and can incorporate the effect of DC loop delay, as will be described.

Figure 2A:
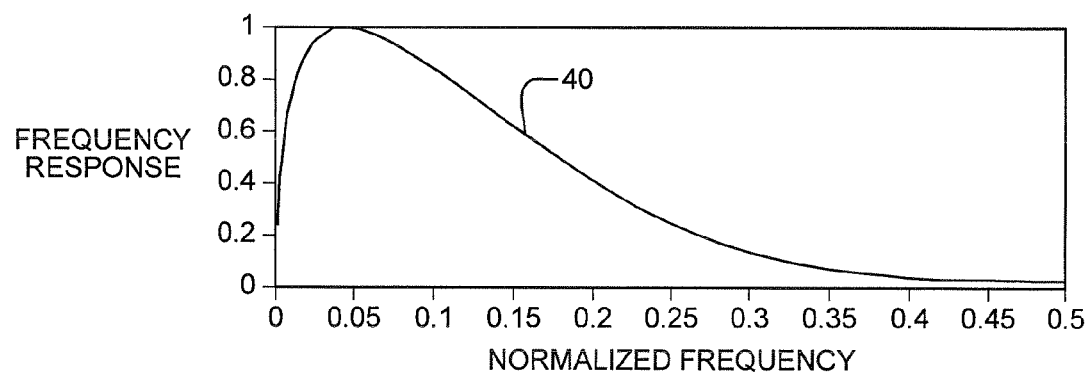
FIGS. 2A-2B are waveform diagrams depicting a perpendicular read channel target impulse response in the frequency domain (FIG. 2A) and in the time domain (FIG. 2B).
Figure 2B:
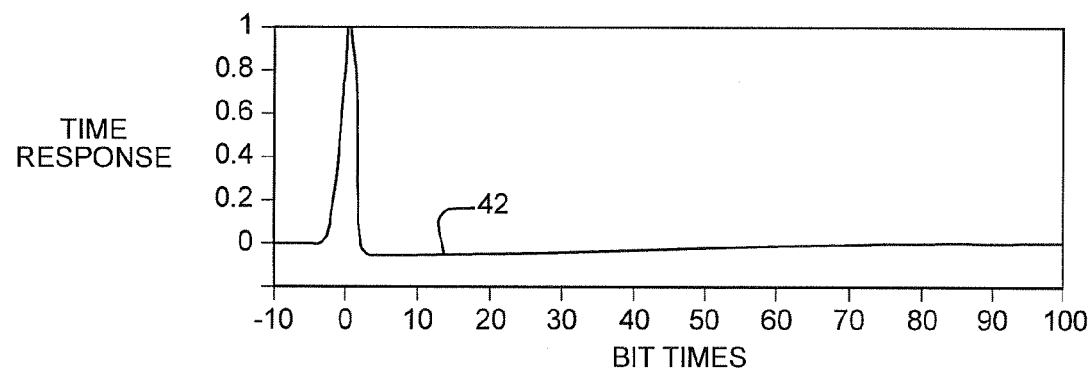

As discussed above, baseline wander is of particular interest where perpendicular read channels are concerned. Due to finite permeability in either a soft under-layer or reader shields and also to the non-zero spacing between the soft under-layer and a recording layer, the perpendicular channel, at the read head output, will have a notch at zero frequency, or DC. FIG. 2A shows a pulse frequency response for a perpendicular read channel in the frequency domain. Due to its low frequency content, there is an abrupt amplitude variation (indicated by reference numeral 40) of the perpendicular response around the DC notch. FIG. 2B shows the pulse response of the perpendicular channel in the time domain with the abrupt amplitude variation 40 (FIG. 2A) resulting in a long and narrow pulse tail, which is indicated by reference numeral 42 in the drawing.

As also discussed above, the effects of high pass filtering of the read signal adversely affect the pulse tail. The term "baseline wander" (hereafter, simply "BW") refers to the superposition of the resulting pulse tails. The BW compensator 34 (FIG. 1) operates to estimate and compensate for the BW. The operations of the BW compensator are discussed in more detail below with reference to FIGS. 3-11.

In the absence of a DC notch, the signal expected at the detector 20, that is, the read channel "target impulse response" (TIR) may be considered to be $(g_0, g_1, \ldots, g_m)$, with memory length m a DC value of $$G(1) = \sum_{i=0}^{m} g_i,$$

which coincides with the z-transform evaluated at z=1. The complete TIR at the detector input, including the pulse tail, can be roughly approximated by passing the TIR through a first order high-pass filter with a time constant of $\tau \gg 1$ bits. However, a first order high-pass filter may not be a sufficiently accurate model. For example, the preamplifier may have a high-pass filter and the read channel may include a second high-pass filter. Accordingly, approach taken in the BW compensator 34, is to model the resultant DC notch with a single first order high-pass filter and account for any mismatch between the first order filter and actual high-pass frequency response as "process noise."

Using a "forgetting factor" of $$\alpha = e^{-1/\tau},$$

the output response of the first order high-pass filter, whose input is the TIR, is well approximated by the superposition of the TIR and a pulse tail given by $t_k = -G(1)(1-\alpha)\alpha^k u(k)$, at time k where u (k) is the step function. Without loss of generality, the first (m+1) samples of the pulse tail may be incorporated into the detector. Thus, the pulse tail can be modeled as $$t_k = -G(1)(1-\alpha)\alpha^k u(k-m-1).  \quad \text{Eq. 1}$$

Three different BW models are now described for the BW compensator 34. The BW models are linear recursive models and, in the described embodiment, derive from the principles of Kalman filtering theory.

A first BW model, referred to herein as the "deterministic model," estimates BW directly from the signals provided to the detector, that is, detector decision data $a_k$. Given the bipolar data sequence $\{a_i\}$, $a_i \in \{1, -1\}$, the total accumulated BW at time k+1 is given by $$v_{k+1} = \sum_{i>m} t_i a_{k+1-i} = -G(1)(1-\alpha) \sum_{i>m} \alpha^i a_{k+1-i}. \quad \text{Eq. 2}$$

From Eq. 2 a simple recursion on $v_k$ can be obtained, giving as a BW estimate:

$$v_{k+1} = \alpha v_k - (1-\alpha)\alpha^{m+1} G(1) a_{k-m} \quad \text{Eq. 3}$$

A second BW model, referred to herein as the "stochastic model," generates the BW estimate from an error signal, i.e., from the difference between the real waveform and an ideal re-generated waveform. For the stochastic model, the data sequence $\{a_k\}$ is random and the random variable $a_k$ is equiprobable, independent and identically distributed. From Eq. 2, with $\tau \gg 1$ and using Central Limit Theorem arguments, the steady-state random sequence $\{v_k\}$ is well approximated by a Gaussian random variable. Thus, BW can be represented as a first order Gauss-Markov process, with $$v_{k+1} = \alpha v_k + w_k \quad \text{Eq. 4}$$

where $w_k$ denotes additive white Gaussian noise (AWGN) or, simply, process noise.

Comparing Eq. 3 with Eq. 4, the variance of the process noise $w_k$ is $$\sigma_w^2 = (1-\alpha)^2 \alpha^{2(1+m)} G(1)^2 \quad \text{Eq. 5}$$

Furthermore, from Eq. 4, $\sigma_w^2$ can be related to the steady-state variance of BW $\sigma_v^2$, as $$\sigma_w^2 = \sigma_v^2 (1-\alpha^2). \quad \text{Eq. 6}$$

with the BW variance representing the pulse tail energy. The approach of the stochastic model works well with random data, however, its performance is significantly degraded for pathological data.

In the deterministic model of Eq. 3, the high-pass filter response is assumed to be exactly known and of the first order. This may be impractical because of time constant uncertainties, and the presence of both known and unknown higher order high-pass filters. On the other hand, in the stochastic model (Eq. 4), the known data information $\{a_k\}$ is treated as a noise disturbance.

A third BW model, referred to herein as the "generalized model", unifies the deterministic and stochastic models. It models BW as $$v_{k+1} = \alpha v_k - (1-\alpha)\alpha^{m+1} G(1) a_{k-m} + w_k \quad \text{Eq. 7}$$

where, unlike in Eq. 4, the role of the process noise $w_k$ is to account for only model uncertainties, i.e., to generate a portion of the BW that is not predicted by the other two terms on the right hand side of Eq. 7. Accordingly, the BW variance $\sigma_v^2$ represents the pulse tail mismatch energy, i.e., the difference between the predicted and the actual pulse tail.

The BW compensation algorithms of these three models may be characterized as "decision directed" since detector decisions are included in the algorithms.

Figure 3:
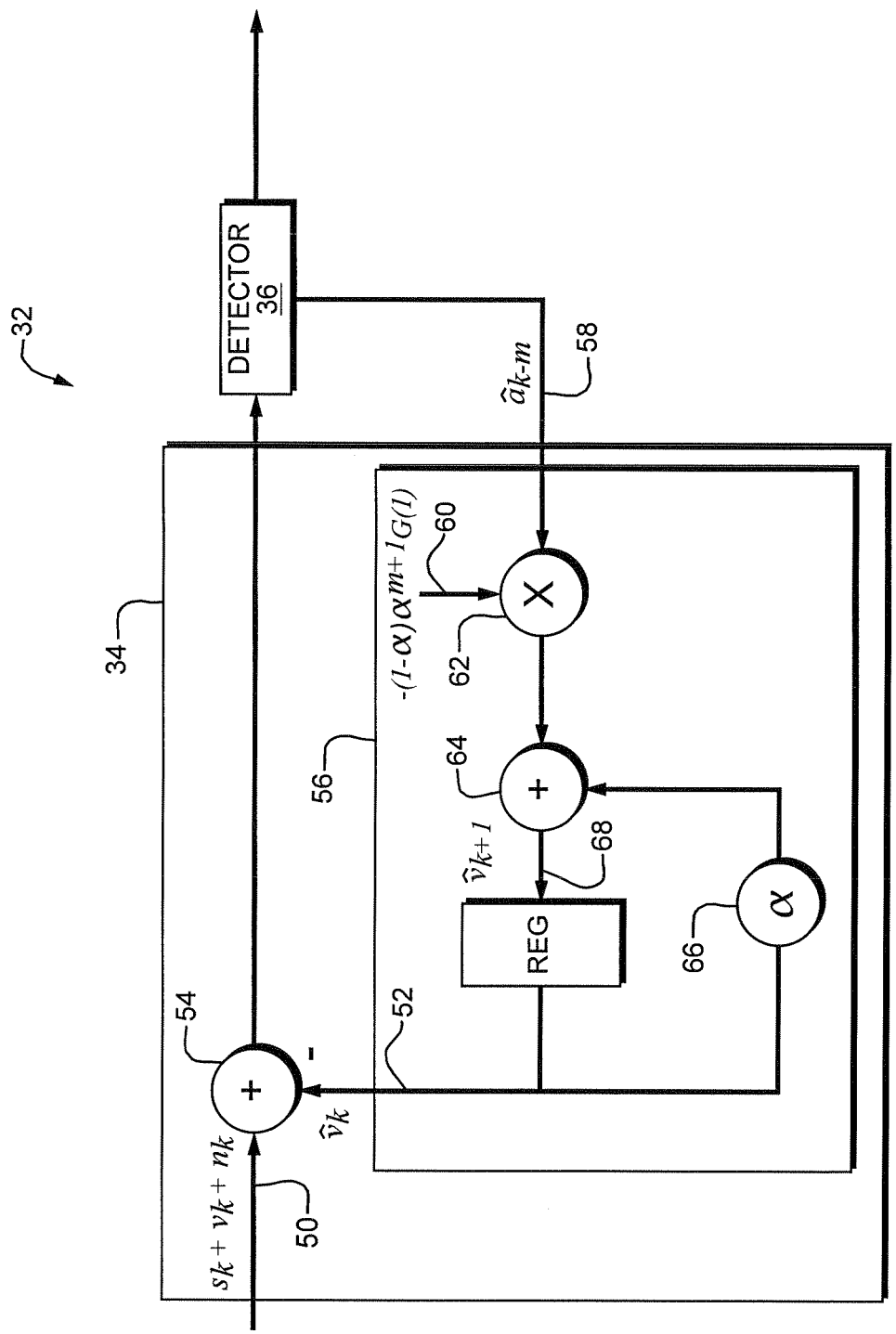
FIG. 3 is a block diagram of an exemplary embodiment of the read signal data recovery circuit (of FIG. 2) that is based on a deterministic model.
Figure 4:
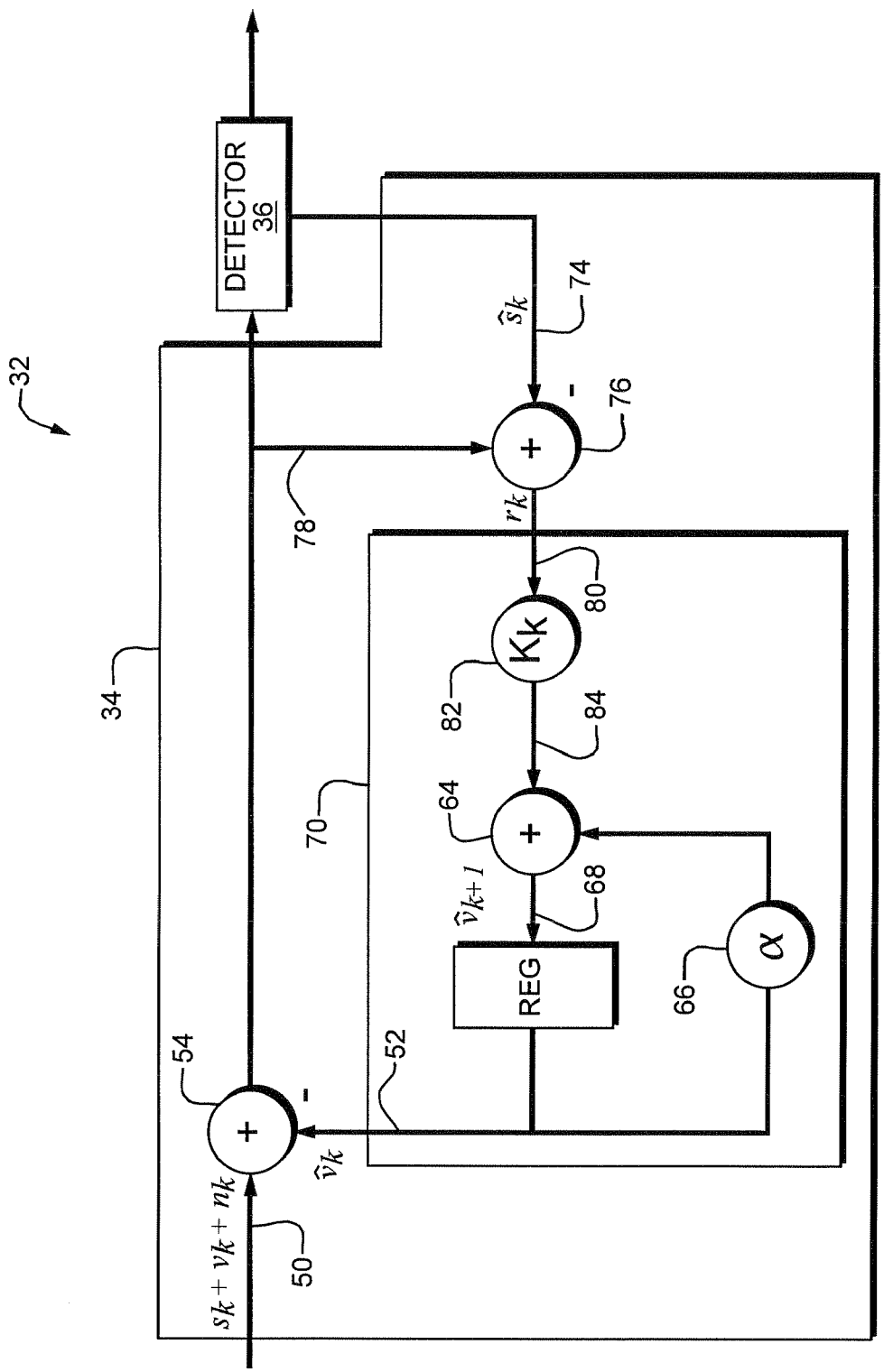
FIG. 4 is a block diagram of an exemplary embodiment of the read signal data recovery circuit (of FIG. 2) that is based on a stochastic model.
Figure 5:
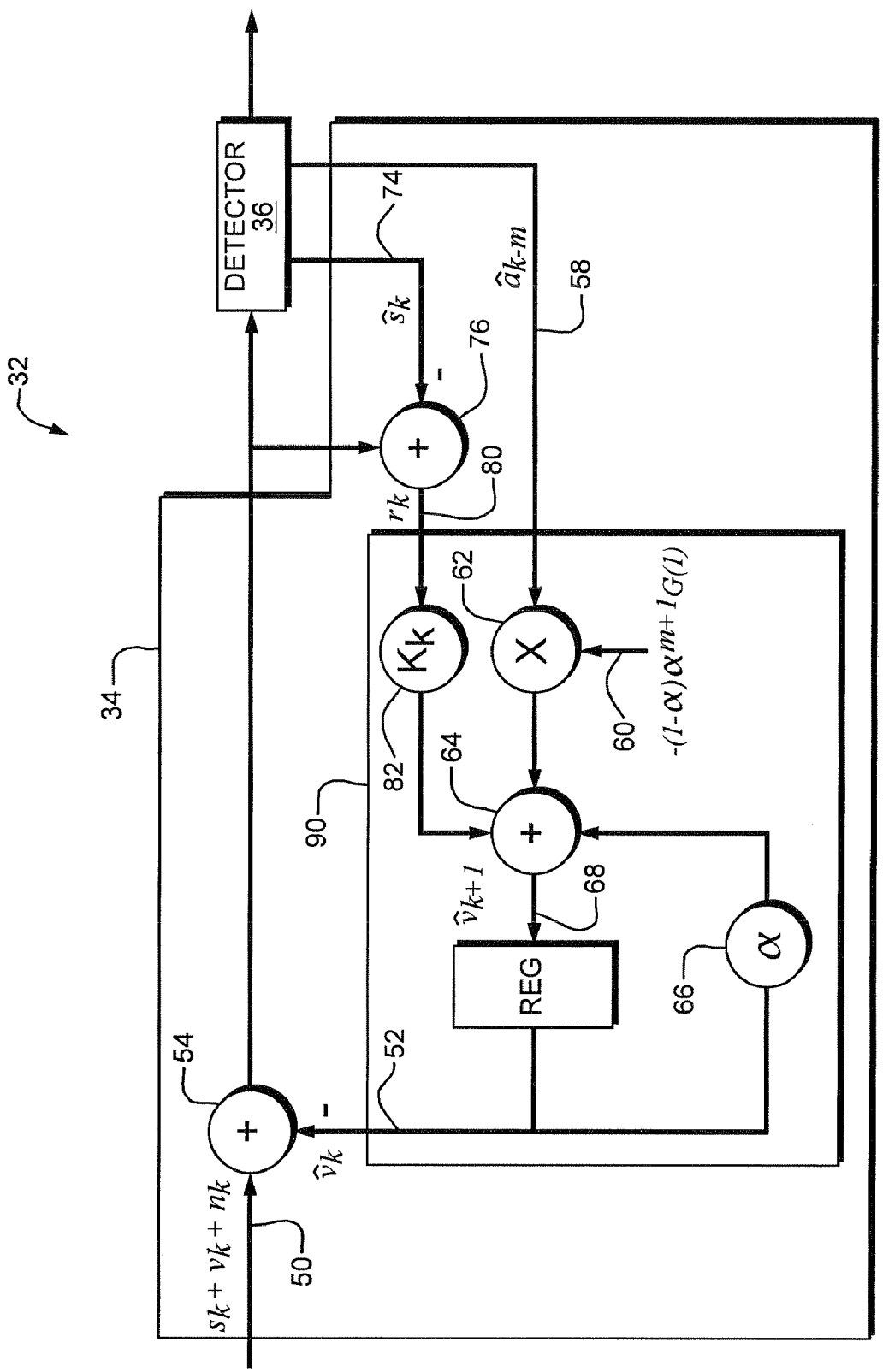
FIG. 5 is a block diagram of an exemplary embodiment of the read signal data recovery circuit (of FIG. 1) that is based on a generalized model.

FIGS. 3-5 depict the read data recovery circuit 32 for the different BW models. In the absence of BW compensation, a sampled waveform on line 50 observed at the detector input at sample time k is represented as $s_k + v_k + n_k$ where $s_k$ is the value of the signal expected at the detector input or $$s_k = \sum_{i=0}^{m} a_{k-i}(g_i + t_i'),$$

$v_k$ is the BW, and $n_k$ is the AWGN. The estimated BW, $\hat{v}_k$, on line 52 is the BW modeled according to one of the three models discussed above. The performance of the respective BW filters at time k can be evaluated from the variance of $(v_k - \hat{v}_k)$ which is denoted by $\sigma_k^2$. The goal of the BW filters is to minimize $\sigma_k^2$.

Referring to FIG. 3, an exemplary embodiment of the read data recovery circuit 32 of FIG. 1 that is based on the deterministic model is shown. In the implementation shown in FIG. 3, the BW compensator 34 includes an adder 54 and a filter 56, which is implemented as a Kalman filter. The BW compensator 34 applies the Kalman filter to minimize $\sigma_k^2$ for all k.

The BW estimate $\hat{v}_k$, on line 52, is added to the incoming sample $s_k + v_k + n_k$ on line 50 by adder 54, to compensate for the BW. The resulting sample is sent to the detector 36, which in turn generates a data decision estimate signal $\hat{a}_{k-m}$ on line 58. It is assumed that $a_{k-m} = \hat{a}_{k-m}$ In this example, the filter input is the data decision estimate $\hat{a}_{k-m}$. The Kalman filter 56 updates the BW estimate as $$\hat{v}_{k+1} = \alpha \hat{v}_k - (1-\alpha)\alpha^{m+1} G(1) \hat{a}_{k-m} \quad \text{Eq. 8}$$

Thus, according to Eq. 8, the filter 56 receives as input the data decision signal on line 58, which it multiples in a multiplier 62 by a gain coefficient $-(1-\alpha)\alpha^{m+1} G(1)$ that is on line 60. A second adder 64 combines the product with a scaled version of the previous BW estimate. The previous BW estimate is multiplied in multiplier 66 by a scaling factor $\alpha$, which is the forgetting factor discussed above. The adder 64 thus produces the updated BW estimate $\hat{v}_{k+1}$ on line 68. A register 69 provides the updated BW estimate value as $\hat{v}_k$ at the next sample time k.

Referring to FIG. 4, an exemplary embodiment of the read data recovery circuit 32 that is based on a stochastic model is shown. In this embodiment, the BW compensator 34 includes the adder 54 and a BW filter 70, which is implemented as a Kalman filter. The adder 54 removes the estimated BW from the signal on line 50. The detector 36 then generates and provides as input to the BW compensator 34 a signal estimate $\hat{s}_k$ on line 74. An adder 76 adds the signal estimate (ideal input waveform) on line 74 to the real input waveform on line 78, to produce on line 80 a residual (or error signal) $r_k = n_k + v_k - \hat{v}_k$. The residual, or what has been called process noise above, is provided as the input to the filter 70. The filter 70 updates the BW estimate as $$\hat{v}_{k+1} = \alpha \hat{v}_k + K_k r_k \quad \text{Eq. 9}$$

where $K_k$ is a Kalman gain coefficient that is applied to the residual $r_k$ by a multiplier 82, and the term $K_k r_k$ essentially represents the process noise. The Kalman gain, which is updated for each sample time, is $$K_k = \sigma_k^2 / (\sigma_k^2 + \sigma_n^2)$$  Eq. 10

Note that the stochastic model relies on data decisions that are made inside the detector 36 to generate the signal estimate $\hat{s}_k$.

Referring to FIG. 5, an exemplary embodiment of the read data recovery circuit 32 that is based on a generalized model is shown. In the illustrated embodiment, the BW compensator 34 includes a BW filter 90 that has at least two (two are shown) types of inputs. Again, the filter is a Kalman filter. One input is the estimated data signal $\hat{a}_{k-m}$ on line 58, and the other input is the residual, or error, signal $r_k$ on line 80. Both the data signals $\hat{a}_{k-m}$ and the residuals $r_k$ are scaled by derived filter gain coefficients. The data decision signals $\hat{a}_{k-m}$ are scaled by a gain coefficient that is based on a deterministic model of the pulse tail, and the residual signals are scaled by the Kalman gain. The recursive filter output is updated by scaling the previous estimate $\hat{v}_k$ by the scale factor α in a multiplier 66, and then adding the result to the scaled data and residual signals in an adder 64.

As before, the BW estimate $\hat{v}_k$ on line 52 is removed from the incoming sample $s_k+v_k+n_k$ on line 50 by adder 54. The resulting sample is sent to the detector 36, which in turn generates the signal estimate $\hat{s}_k$ and the data decision estimate $\hat{a}_{k-m}$. Throughout it is assumed that $a_{k-m}=\hat{a}_{k-m}$ and $s_k=\hat{s}_k$. The two filter inputs are thus the residual $r_k=n_k+v_k-\hat{v}_k$, and the data decision $\hat{a}_{k-m}$. The Kalman filter updates the BW estimate as $$\hat{v}_{k+1} = \alpha\hat{v}_k - (1-\alpha)\alpha^{m+1}G(1)\hat{a}_{k-m} + \alpha K_k r_k$$  Eq. 11

Eq. 11 describes the generalized filter. It may be noted that Eq. 11 is quite similar to Eq. 7, with the unknown process noise $w_k$ now estimated by $K_k r_k$.

Figure 6:
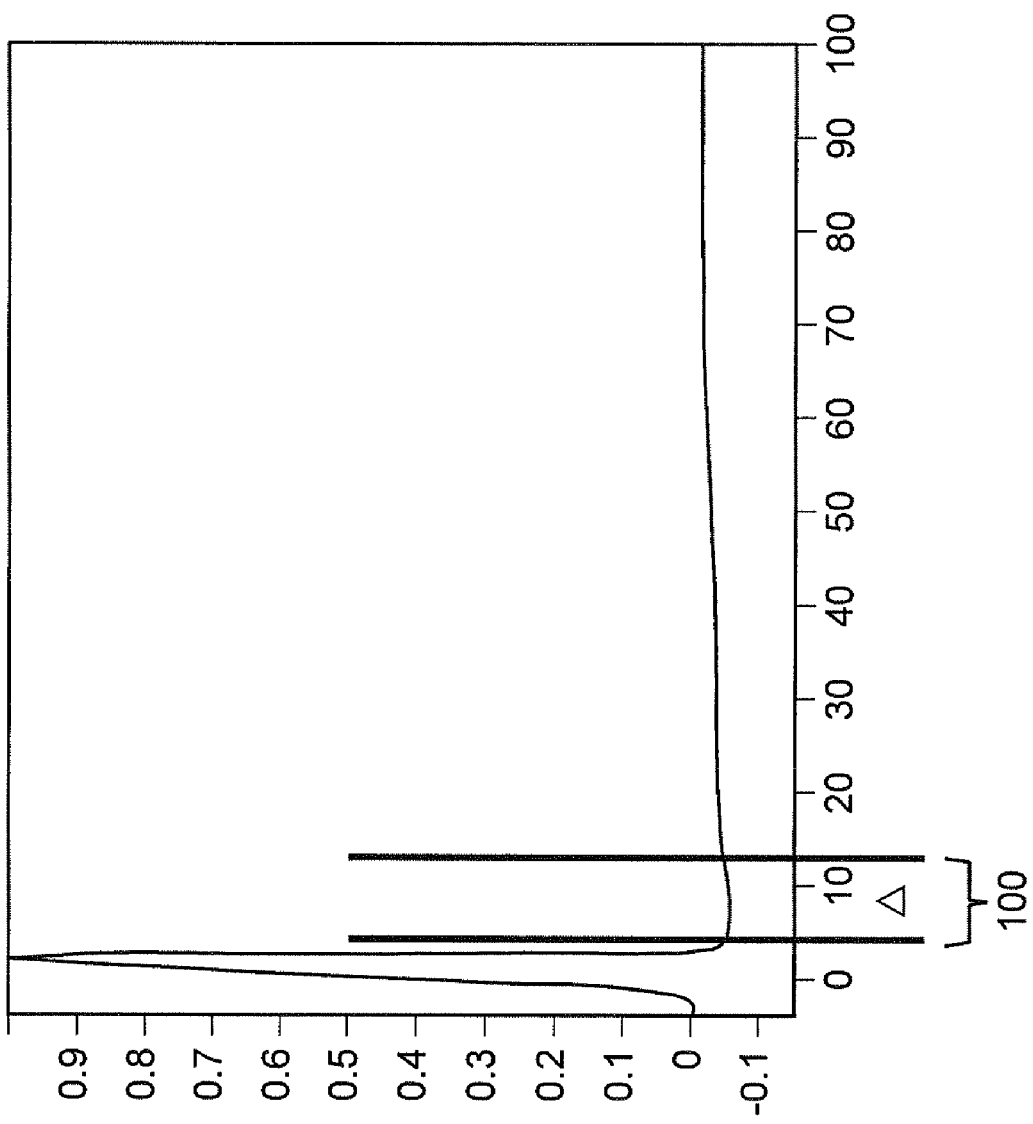
FIG. 6 is a diagram depicting a region in the read channel target impulse response that cannot be recovered by the read channel detector.

In read data recovery circuits 32 that employ Viterbi detectors as the detectors 36, there is a loop delay of Δ>0 associated with the circuitry. The total delay Δ consists of two parts, a delay of δ through the detector 36 and a delay of Δ-δ through the Kalman filter. As shown in FIG. 6, this delay corresponds to a region in the target impulse response (indicated by reference numeral 100), and a decision-directed BW compensator does not recover BW in this region. As discussed below, the effect of the loop delay on BW compensation may be minimized by using a dual-detector architecture or, alternatively, by using of a single-detector architecture in which the BW compensator is modified to compensate for the loop delay.

Figure 7:
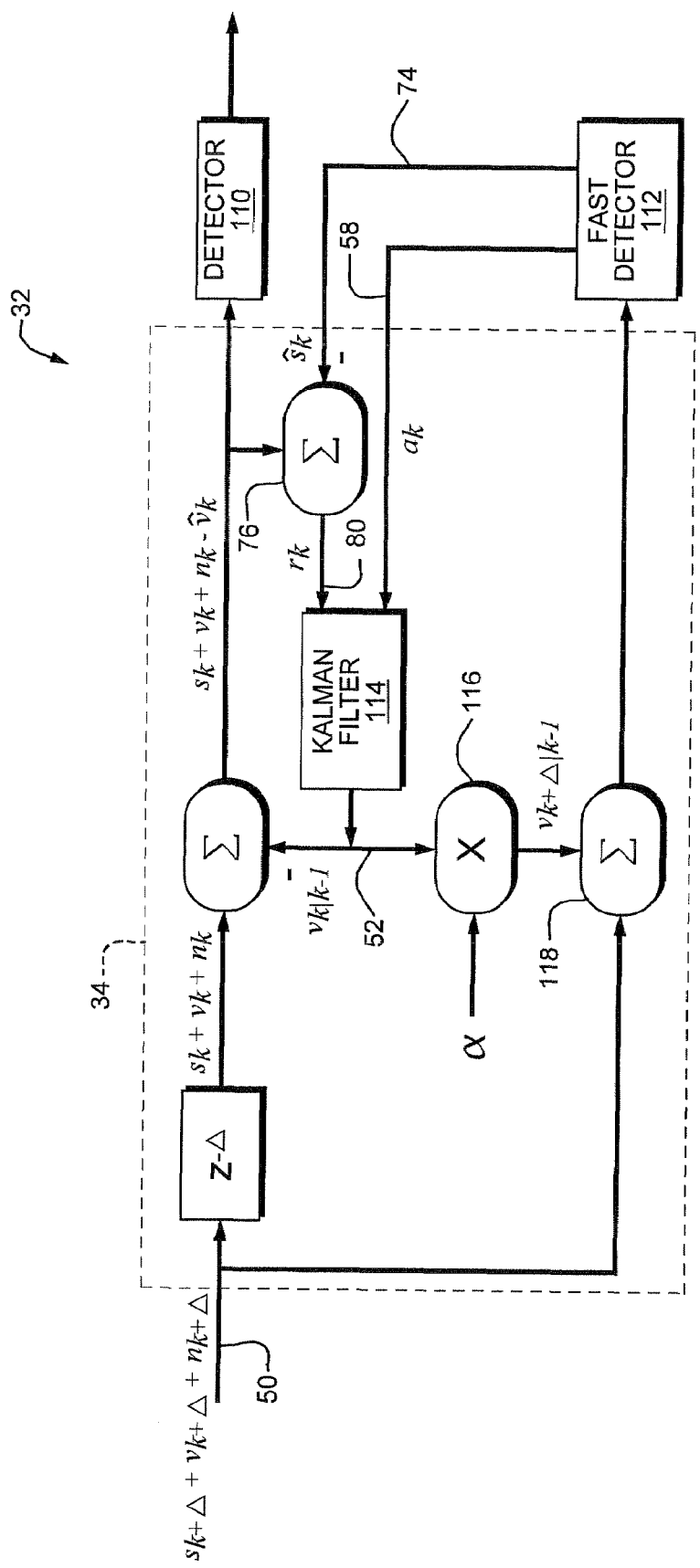
FIG. 7 is a block diagram of an exemplary dual-detector embodiment of the read signal data recovery circuit.

FIG. 7 shows an exemplary dual-detector embodiment of the read data recovery circuit 32. In a dual detector architecture, circuit 32 includes a first, "main" detector 110 and, a second, "fast" detector 112, which is coupled to the BW compensator 34. The BW compensator 34 includes a BW filter 114, which may have the same design as the filter 90 shown in FIG. 5.

At sample time k+Δ the input signal is provided on line 50 to the fast detector 112 through an adder 111. The adder 111 removes from the input signal a scaled BW estimate $\hat{v}_{k+\Delta|k-1}$ where the k−1 term in the subscript denotes that the BW estimate includes the residual or error signal from the k−1 sample. The fast detector receives the signal $s_{k+\Delta}+n_{k+\Delta}+v_{k+\Delta}-\hat{v}_{k+\Delta|k-1}$ and, with a latency δ, produces a data decision estimate $\hat{a}_k$ and a signal estimate $\hat{s}_k$. These estimates are provided to the BW compensator 34, which operates in the manner described above with respect to FIG. 3, 4 or 5, with an associated delay of Δ-δ to produce an updated BW estimate $\hat{v}_{k|k-1}$ that is then provided directly, that is, without scaling, to the adder 54.

At the same time, the input signal $s_{k+\Delta}+v_{k+\Delta}+n_{k+\Delta}$ is provided to a delay element 51, which delays the signal by Δ before providing the signal (now indexed at time k) to the adder 54. The adder 54 removes from the signal the updated BW estimate $\hat{v}_{k|k-1}$ that the BW compensator has calculated based on the corresponding estimated signal and data decision values provided by the detector 112 for that particular signal sample. The result is then provided to both an adder 66, to produce an updated residual error signal for the BW compensator, and also to the main detector 110. The main detector 110 then makes the data decision that is passed to the decoder 20 (FIG. 1).

The dual-detector solution essentially eliminates performance loss due to loop latency when $s_k=\hat{s}_k$, that is, when the decisions made by the fast detector 112 are correct. In fact, based on simulations of the dual-detector architecture, no SNR loss is observed even with pathological data patterns.

Two detectors may be available in the read channel, for example, one for data and a second for timing extraction, and the circuitry of FIG. 7 can then utilize these detectors in the manor described above. Otherwise, a second detector must be added.

As discussed above, another approach to the loop latency issue is to modify the BW compensator 34 in a single-detector architecture (such as those shown in FIGS. 3-5), to compensate for the loop delay. FIGS. 8-11 illustrate examples of such single-detector architectures for the different BW models described earlier.

The single detector architecture that is based on the deterministic model can be thought of as modeling the BW estimate $\hat{v}_k$ as two components, $v_k=\hat{v}_k+\check{v}_k$, where $$\check{v}_{k+1} = \sum_{i=m+1}^{\Delta} t_i a_{k+1-i},$$  Eq. 12 and $$\hat{v}_{k+1} = \sum_{i>\Delta} t_i a_{k+1-i} = \alpha\hat{v}_k - (1-\alpha)\alpha^{\Delta+1}G(1)\hat{a}_{k-\Delta}.$$  Eq. 13

With a total loop delay of Δ, and a detector delay of m≤δ≤Δ, the filter that is based on the deterministic model, that is, on expected data decisions, does not make any estimate for the component $\check{v}_k$. The BW compensator 34 therefore estimates and compensates for the associated loop delay for the component $\hat{v}_k$. The filter produces $$\hat{v}_{k+1} = \alpha\hat{v}_k - (1-\alpha)\alpha^{\Delta+1}G(1)\hat{a}_{k-\delta}$$  Eq. 14 where the scaling factor $\alpha^{\Delta+1}$ optimizes the gain coefficient to compensate for the loop delay.

Figure 8:
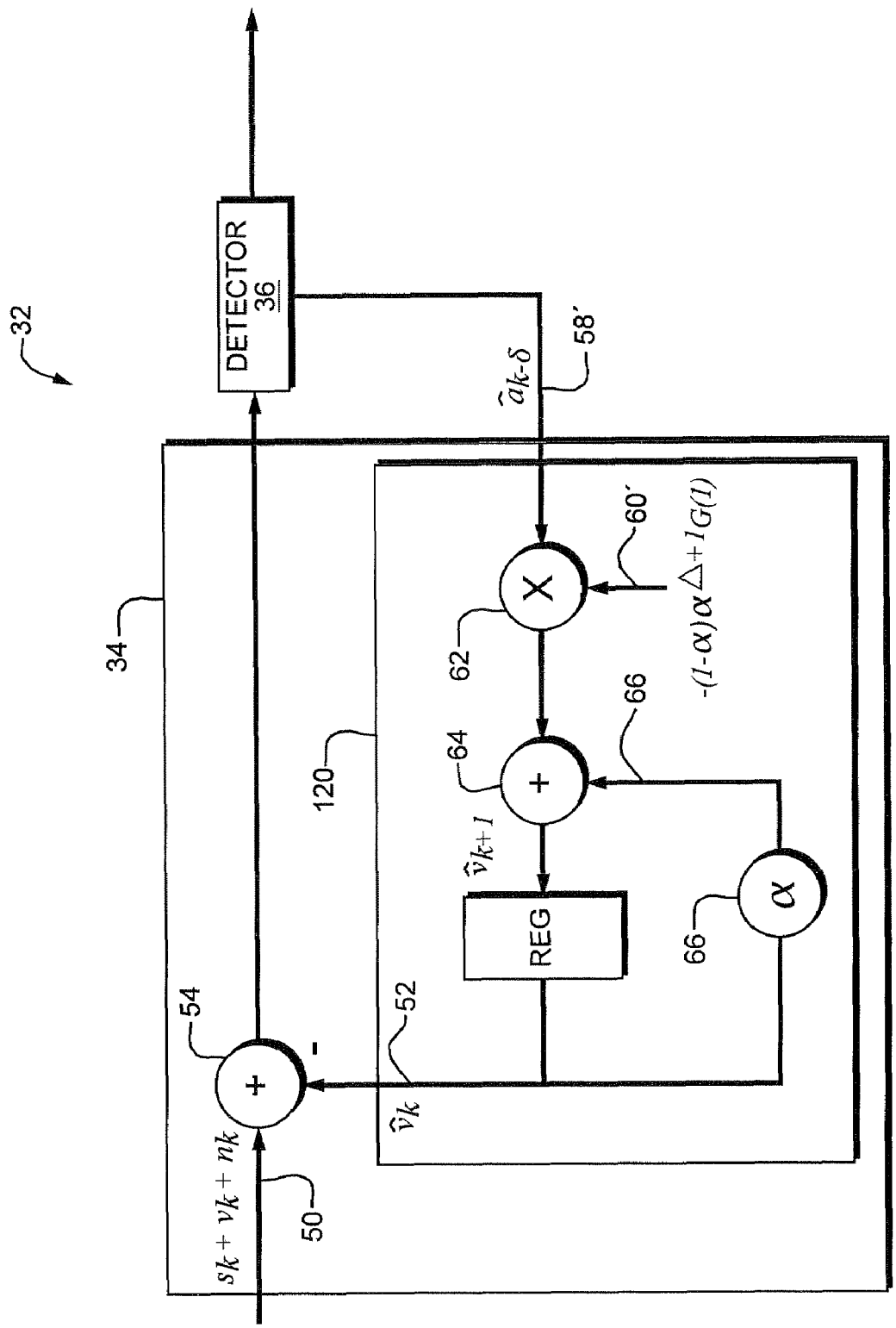
FIG. 8 is a detail block diagram of an exemplary embodiment of the read signal data recovery circuit, based on the deterministic model, with loop latency.

Referring now to FIG. 8, the multiplier 62 applies the optimized gain coefficient on line 60 to the data estimate, which is delayed at the detector by δ. The result is then added to the previous BW estimate, which as discussed above with reference to FIG. 3, is scaled in the feedback loop by the scaling factor α. The deterministic model thus compensates for the delay by incorporating into the modeled gain coefficient the optimizing scaling factor $\alpha^{\Delta+1}$.

Figure 9:
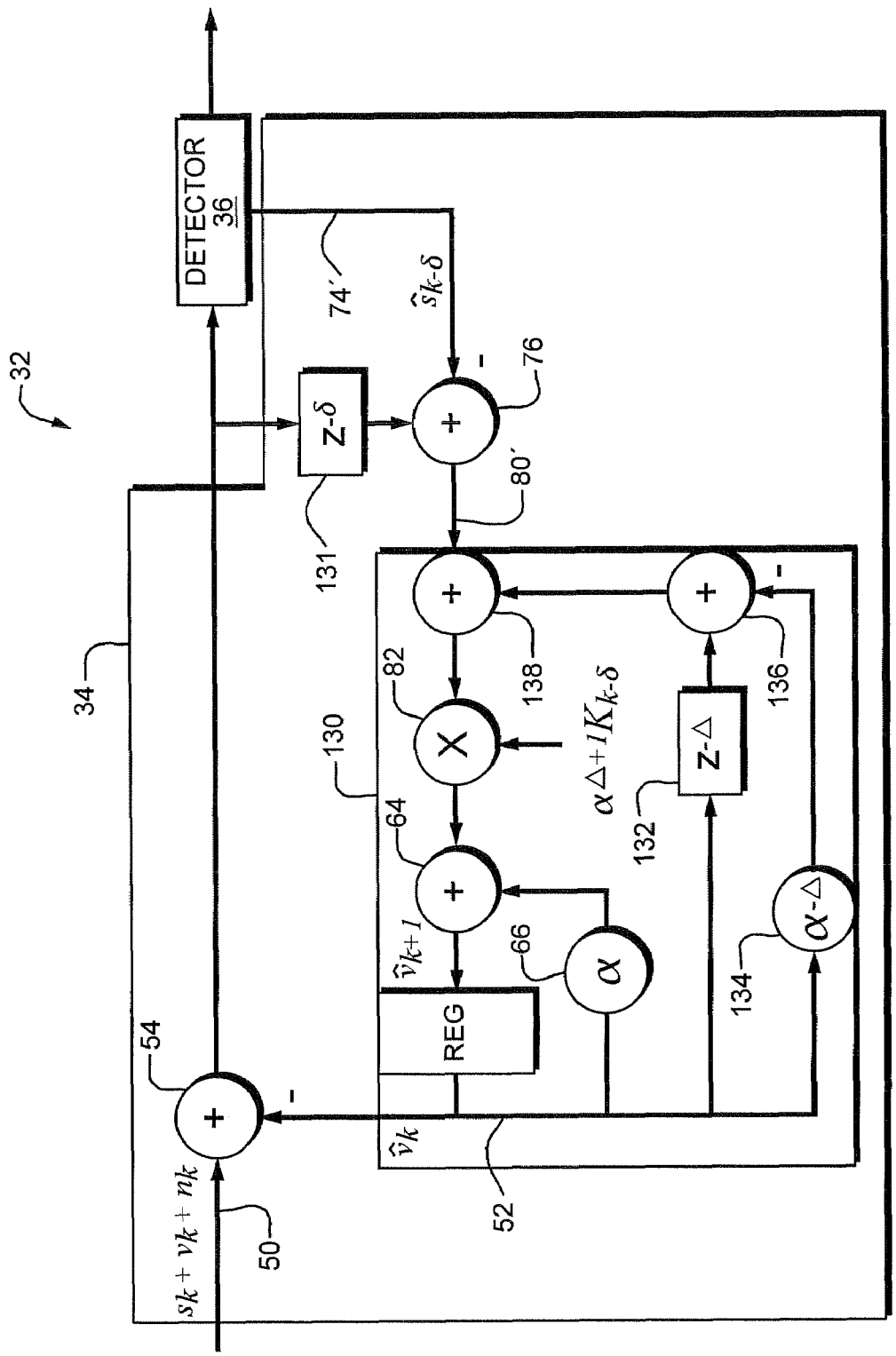
FIG. 9 is a detail block diagram of an exemplary embodiment of the read signal data recovery circuit, based on the stochastic model, with loop latency.

FIG. 9 illustrates a single detector architecture that compensates for the loop delay that is based on the stochastic model. The BW compensator in this embodiment includes a filter 130 that combines delayed and scaled "feedback terms" into the residual to produce an "effective residual" that is then subjected to the Kalman gain. Based on an analysis of the loop delay for the stochastic model compensator, the filter 130 is represented as $$\hat{v}_{k+1} = \alpha \hat{v}_k + \alpha^{\Delta+1} K_{k-\delta}(r_k + \hat{v}_{k-\Delta} - \alpha^{-\Delta} \hat{v}_k), \qquad \text{Eq. 15}$$

with $r_k = v_{k-\delta} - \hat{v}_{k-\delta} + n_{k-\delta}$ Compared to Eq. 9, the Kalman gain is optimized to compensate for the loop delay by the factor $\alpha^{\Delta+1}$. Further, the signal estimate, which is delayed through the detector by δ, is combined with an incoming signal that is delayed by δ in a delay element 37. In addition, the residual is augmented to include the feedback terms, which are a BW estimate that is delayed by Δ in delay element 132 and a BW estimate that is multiplied by a scaling factor $\alpha^{-\Delta}$.

Referring again to the drawing, the combination of the scaled and delayed BW estimates produced by adder 136 is added to the residual in the adder 62, to produce the effective residual. The effective residual is then multiplied by the optimized Kalman filter gain. The result, which includes compensation for the loop delay, is then added to the scaled version of the BW estimate in an adder 66, to produce the updated BW estimate. In the stochastic model compensator, the terms $\hat{v}_{k-\Delta}$ and $-\alpha^{-\Delta}\hat{v}_k$ are the feedback terms and the effective residual is thus $r_k + \hat{v}_{k-\Delta} - \alpha^{-\Delta}\hat{v}_k$. It will be appreciated that the two feedback terms are included for delay compensation.

Figure 10:
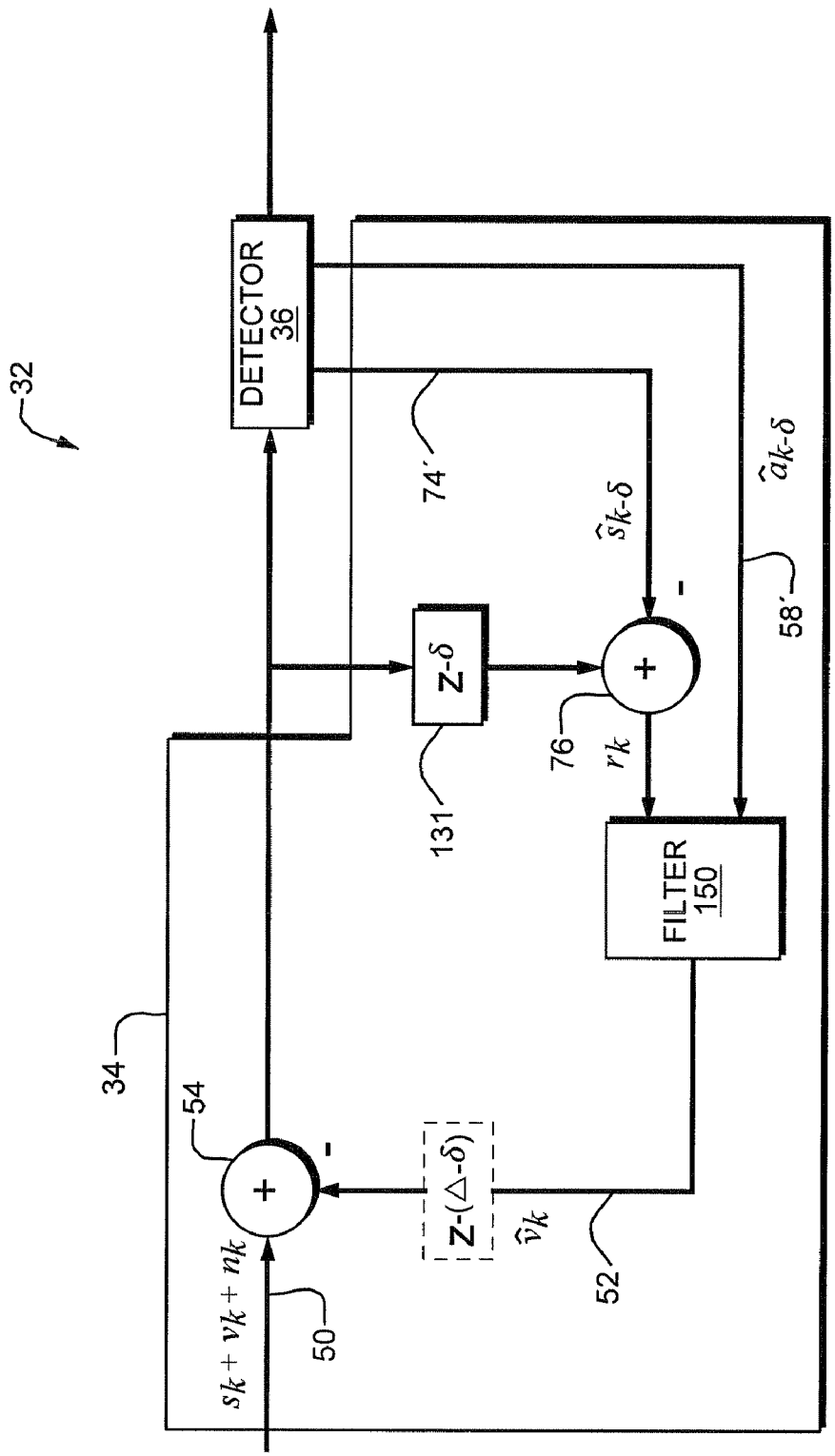
FIG. 10 is a detail block diagram of an exemplary embodiment of the read signal data recovery circuit, based on the generalized model, with loop latency.
Figure 11:
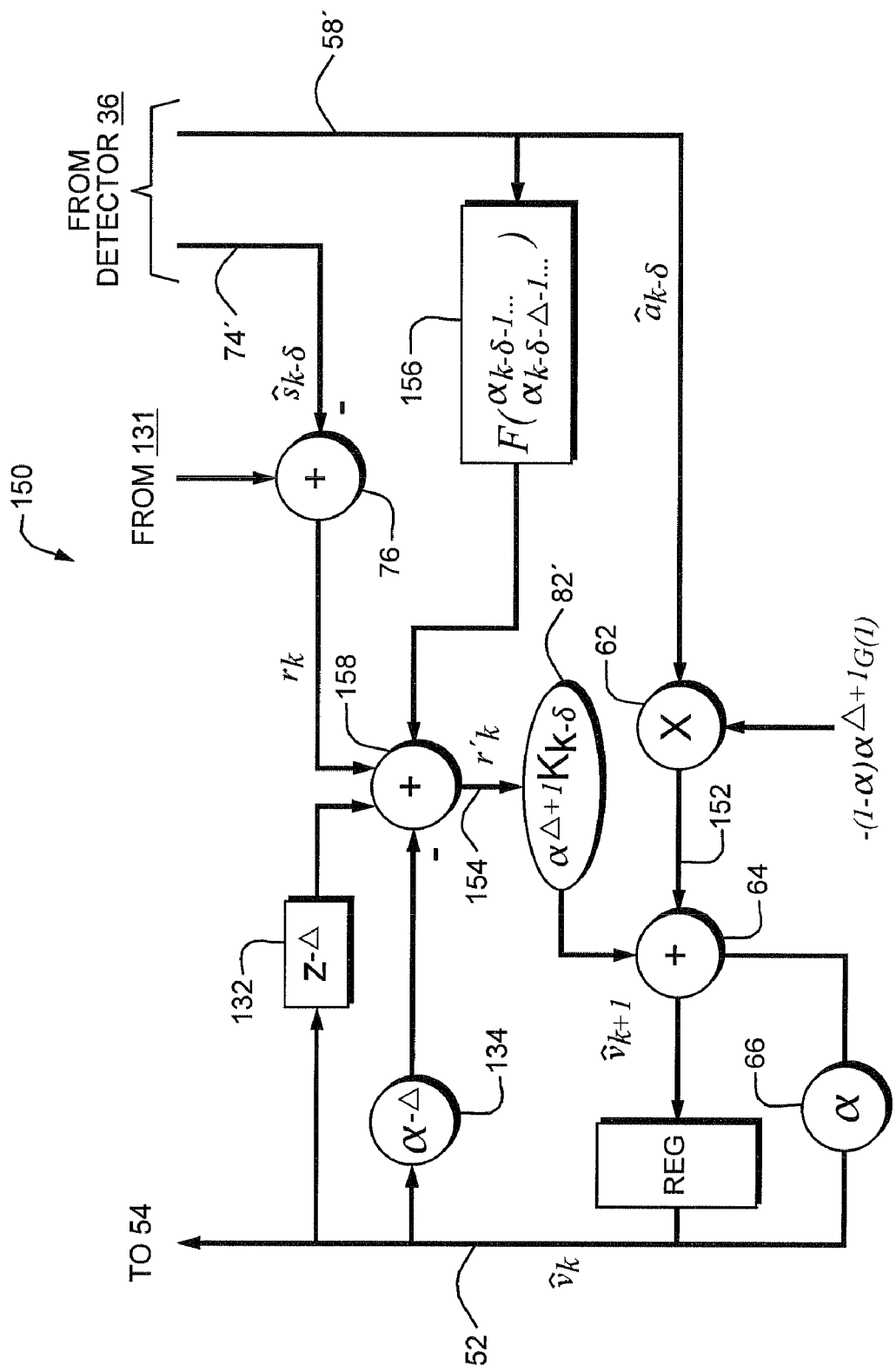
FIG. 11 is a detailed diagram of a filter used in the read signal data recovery circuit shown in FIG. 10.

Referring now to FIGS. 10 and 11, the read signal data recovery circuit 32 having a BW compensator that compensates for loop latency that is based on the generalized model is shown. In this embodiment, the BW compensator 34 includes a BW filter 150. Details of the BW filter 150 are shown in FIG. 11. For the generalized model the two components of the BW estimate $v_k = \hat{v}_k + \check{v}_k$, are modeled, with the component $\hat{v}_k$ modeled as $$\hat{v}_{k+1} = \alpha \hat{v}_k - (1-\alpha)\alpha^{\Delta+1} G(1) \hat{a}_{k-\Delta} + w_k$$

where the process noise $w_k$ has a variance of $\sigma^2_{v,\Delta} = (1-\alpha)^{2(1+\Delta)} G(1)^2$ which is similar to Eq. 5. However, the process noise $w_k$ is now modeled as $n_k + \check{v}_k$. The filter produces an updated BW estimate as:

$$\hat{v}_{k+1} = \alpha \hat{v}_k - (1-\alpha)\alpha^{\Delta+1} G(1) \hat{a}_{k-\delta} + \alpha^{\Delta+1} K_{k-\delta} r'_k, \qquad \text{Eq. 16}$$

where $r'_k$ is the effective residual which, using this model, is:

$$r'_k = r_k + \hat{v}_{k-\Delta} - \alpha^{-\Delta}\check{v}_k - G(1)(1-\alpha)\alpha \sum_{j=0}^{\Delta} \alpha^j \hat{a}_{k-j-\delta-1} \qquad \text{Eq. 17}$$

with the feedback terms that are combined by adder 158 including a scaled superposition of data decisions $\hat{a}_{k-\delta-\Delta-1}, \ldots, \hat{a}_{k-\delta-1}$, which is produced by element 156. The filter gain is computed as in Eq. 10, but as discussed is based on the modified noise samples $n_k + \check{v}_k$.

The complexity of the filter 150 can be reduced, at the expense of some performance loss, by ignoring the feedback terms in the effective residual computation.

The inventive BW compensator allows the maximal use of perpendicular wave-form signal energy with minimal loss in performance. Furthermore, the BW compensation is robust in the sense that exact wave shapes are not needed.

Other embodiments are contemplated as well. For example, the BW compensation could be performed after the low pass filter but before the ADC. Also, although the BW compensator has been illustrated within the context of a disk drive read channel, it is applicable to other types of channels, for example, communications channels, as well.

It is to be understood that while the invention has been described in conjunction with the detailed description thereof, the foregoing description is intended to illustrate and not limit the scope of the invention, which is defined by the scope of the appended claims. All publications and references cited herein are expressly incorporated herein by reference in their entirety.

What is claimed is:

1. A method for compensating for baseline wander, the method including the steps of:
    A. processing a read channel waveform to produce an estimated data decision signal;
    B. updating an estimated baseline wander signal by filtering the estimated data signal to produce an estimate of the associated pulse tail and combining the result with a prior estimated baseline wander signal;
    C. compensating for baseline wander by combining a next signal sample with the updated estimated baseline wander signal; and
    D. repeating steps A-C using the updated estimated baseline wander signal as the estimated baseline wander signal.

2. The method of claim 1 wherein the step of combining includes scaling the prior estimated baseline wander signal in accordance with a scale factor that is based on the time constant of the filter.

3. The method of claim 1 wherein the filtering step further includes compensating for associated processing delays by optimizing a filter gain coefficient.

4. The method of claim 1 further including
    in the step of processing the read channel waveform, producing an estimated signal;
    combining the estimated signal with the read channel waveform to produce a residual signal and filtering the residual signal to produce an updated residual signal; and
    combining the updated residual signal with the estimate of the associated pulse tail before combining the result with the prior estimated baseline wander signal.

5. The method of claim 4 wherein the step of combining includes scaling the prior estimated baseline wander signal in accordance with a scale factor that is based on the time constant of the filter.

6. The method of claim 5 wherein the step of combining the estimated signal with the read channel waveform further includes compensating for a processing delay by delaying the read channel waveform by a delay time that corresponds to the processing delay.

7. The method of claim 6 wherein the filtering step further includes compensating for the processing delay by optimizing a filter gain coefficient.

8. The method of claim 7 further including a step of producing an effective residual signal by combining the residual signal with feedback terms that are scaled and delayed versions of the estimated baseline wander signal.

9. The method of claim 8 further including in the step of producing the effective residual signal combining a manipulated data decision signal that is based on a predetermined number of prior estimated data decision signals.

10. The method of claim 9 wherein the predetermined number is based on the length of the processing delay.

11. A method of compensating for baseline wander, the method including the steps of:
   A. processing a read channel waveform to produce an estimated data signal and an estimated signal;
   B. combining the estimated signal with the read channel waveform to produce a residual signal;
   C. filtering the residual signal and the estimated data signal to produce an updated residual signal and an estimate of the associated pulse tail; and
   D. updating an estimated baseline wander signal by combining the estimate of the pulse tail, the updated residual signal and a prior estimated baseline wander signal;
   E. compensating for baseline wander by combining the updated estimated baseline wander signal with the read channel waveform at a next signal sample time; and
   F. repeating steps A-E using the updated estimated baseline wander signal as the estimated baseline wander signal.

12. The method of claim 11 wherein the step of combining includes scaling the prior estimated baseline wander signal in accordance with a scale factor that is based on the time constant of the filter.

13. The method of claim 12 wherein the step of combining the estimated signal with the read channel waveform further includes compensating for a processing delay by delaying the read channel waveform by a delay time that corresponds to the processing delay.

14. The method of claim 13 wherein the filtering step further includes compensating for the processing delay by optimizing a filter gain coefficient.

15. The method of claim 14 further including a step of producing an effective residual signal by combining the residual signal with feedback terms that are scaled and delayed versions of the estimated baseline wander signal.

16. The method of claim 15 further including in the step of producing the effective residual signal combining a manipulated data decision signal that is based on a predetermined number of prior estimated data decision signals.

17. The method of claim 16 wherein the predetermined number is based on the length of the processing delay.

* * * * *